(12) United States Patent
Patton et al.

(10) Patent No.: US 9,187,247 B2
(45) Date of Patent: Nov. 17, 2015

(54) VALVE DEVICES, SYSTEMS, AND METHODS FOR CONTROLLING THE DISTRIBUTION OF MATERIALS

(71) Applicant: GALA INDUSTRIES, INC., Eagle Rock, VA (US)

(72) Inventors: Damon M. Patton, Roanoke, VA (US); Jason Barr, Blue Ridge, VA (US); George N. Benoit, Clifton Forge, VA (US); J. Wayne Martin, Buchanan, VA (US)

(73) Assignee: Gala Industries, Inc., Eagle Rock, VA (US)

( * ) Notice: Subject to any disclaimer, the term of this patent is extended or adjusted under 35 U.S.C. 154(b) by 0 days.

(21) Appl. No.: 14/488,846

(22) Filed: Sep. 17, 2014

(65) Prior Publication Data

US 2015/0001036 A1    Jan. 1, 2015

Related U.S. Application Data

(62) Division of application No. 13/482,317, filed on May 29, 2012, now Pat. No. 8,863,931.

(60) Provisional application No. 61/491,226, filed on May 29, 2011.

(51) Int. Cl.
*B65G 11/12*   (2006.01)
*B65G 11/20*   (2006.01)
*B65G 47/72*   (2006.01)

(52) U.S. Cl.
CPC .............. *B65G 11/126* (2013.01); *B65G 11/12* (2013.01); *B65G 11/20* (2013.01); *B65G 11/206* (2013.01); *B65G 47/72* (2013.01)

(58) Field of Classification Search
CPC .... B65G 11/126; B65G 11/206; B65G 11/12; B65G 11/20; B65G 47/72
USPC .................................. 193/3, 4, 14, 16, 23, 29
See application file for complete search history.

(56) References Cited

U.S. PATENT DOCUMENTS

| | | | | |
|---|---|---|---|---|
| 352,583 A | * | 11/1886 | Spencer, Jr. ..................... | 193/23 |
| 647,749 A | * | 4/1900 | Hall ................................ | 193/23 |

(Continued)

FOREIGN PATENT DOCUMENTS

| | | |
|---|---|---|
| CN | 200992403 Y | 12/2007 |
| CN | 201249998 Y | 6/2009 |

(Continued)

OTHER PUBLICATIONS

International Search Report and Written Opinion dated Sep. 7, 2012 for related PCT Patent Application No. PCT/US2012/039819.

(Continued)

*Primary Examiner* — Leslie A Nicholson, III
*Assistant Examiner* — Keith R Campbell
(74) *Attorney, Agent, or Firm* — Troutman Sanders LLP; Ryan A. Schneider; Benjamin C. Wiles

(57) ABSTRACT

The various embodiments of the present invention are directed to valve devices, systems, and methods for controlling the distribution of materials to multiple locations. The improved valve devices, materials distribution systems, and materials distribution methods disclosed herein are particularly suitable for use in applications where the materials being distributed are, for example but not limited to, non-gaseous fluid materials (e.g., raw liquids, solutions, slurries, colloids, suspensions, and the like) and solid materials having some level of tackiness, moisture content, or like property. The valves, systems, and methods disclosed herein can be operated without having to stop the flow of materials therethrough in order to change the position of the valve from one outlet to another. Further, the valves and systems disclosed herein have few directional changes, therefore there are few, if any, points within the system where the material can get stuck and/or lodged.

21 Claims, 10 Drawing Sheets

(56) References Cited

U.S. PATENT DOCUMENTS

| | | | |
|---|---|---|---|
| 756,931 A | 4/1904 | Bradford | |
| 2,756,859 A * | 7/1956 | Steffen et al. | 193/23 |
| 2,839,171 A | 6/1958 | Ponto | |
| 3,255,857 A * | 6/1966 | Armstrong et al. | 193/23 |
| 3,339,691 A * | 9/1967 | Schlagel, Jr. et al. | 193/23 |
| 3,557,924 A * | 1/1971 | Schlagel, Jr. | 193/23 |
| 3,762,525 A * | 10/1973 | Loveall et al. | 193/23 |
| 3,827,578 A | 8/1974 | Hough | |
| 3,874,490 A * | 4/1975 | McAlister | 193/23 |
| 4,159,053 A | 6/1979 | Taylor | |
| 4,252,479 A | 2/1981 | Scherfenberg | |
| 4,347,922 A | 9/1982 | Curry et al. | |
| 4,582,097 A | 4/1986 | Izzi et al. | |
| 4,623,056 A * | 11/1986 | Flaugher | 193/23 |
| 4,807,662 A | 2/1989 | Verne | |
| 4,902,185 A | 2/1990 | Dixon et al. | |
| 5,380,162 A * | 1/1995 | Evans et al. | 417/223 |
| 5,803,695 A * | 9/1998 | Schlagel | 414/301 |
| 6,602,555 B1 * | 8/2003 | von Fraunhofer | 427/435 |
| 7,267,145 B2 * | 9/2007 | Nyhof et al. | 141/314 |
| 7,311,486 B2 * | 12/2007 | Gorza et al. | 414/301 |
| 7,419,305 B2 * | 9/2008 | Nisley et al. | 384/477 |

FOREIGN PATENT DOCUMENTS

| | | |
|---|---|---|
| CN | 201390509 Y | 1/2010 |
| DE | 908474 C | 4/1954 |
| JP | 3311632 A | 8/1958 |
| JP | 4713306 A | 5/1972 |
| JP | H0624416 A | 2/1994 |
| JP | 2003236463 A | 8/2003 |
| JP | 2007503372 A | 2/2007 |
| TW | 200720070 A | 6/2007 |
| TW | 201307178 A | 2/2013 |
| WO | 2012166704 A1 | 12/2012 |

OTHER PUBLICATIONS

Chinese Office Action mailed Jan. 29, 2015 for Chinese Patent Application No. 2012800278374.

Office Action in related Korean Patent Application No. KR10-2013-7034246, dated Jan. 16, 2015.

Office Action in related Taiwanese Patent Application No. TW101119210, mailed Feb. 13, 2015.

Search Report in related Taiwanese Patent Application No. TW101119210, mailed Feb. 13, 2015.

Supplementary Partial European Search Report in related European Application No. EP12792268, mailed Apr. 17, 2015.

Office Action in related Japanese Patent Application No. JP2014513637, mailed Jan. 19, 2015.

* cited by examiner

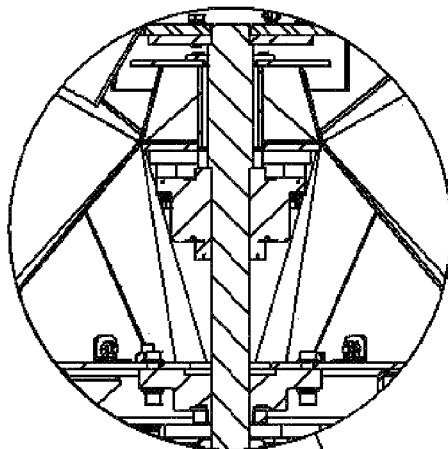
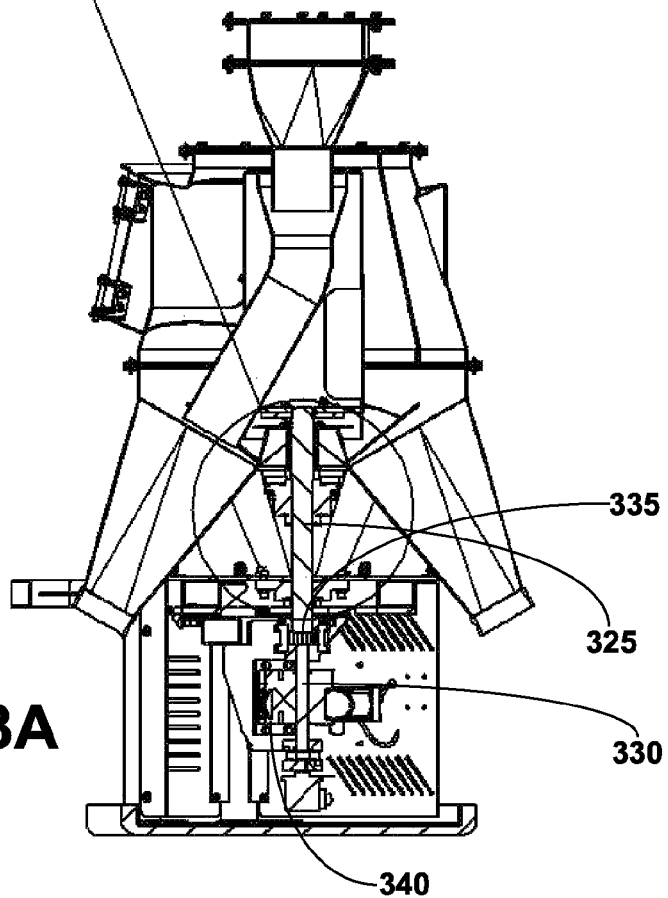
Figure 3B
Figure 3A

VALVE DEVICES, SYSTEMS, AND METHODS FOR CONTROLLING THE DISTRIBUTION OF MATERIALS

CROSS-REFERENCE TO RELATED APPLICATION

This application is a divisional of, and claims priority under 35 U.S.C. §120 to, U.S. patent application Ser. No. 13/482,317, filed 29 May 2012, which claims priority under 35 U.S.C. §119 to U.S. Provisional Patent Application No. 61/491,226, filed 29 May 2011, both of which are hereby incorporated by reference in their entireties as if fully set forth herein.

BACKGROUND

1. Field

The various embodiments of the present invention relate to valve devices and methods for controlling the distribution of materials.

2. Description of Related Art

Current devices for controlling the distribution of materials from one source to one or more destinations suffer from drawbacks when the materials being distributed are not dry solids and are, for example, tacky materials or pellet-fluid slurries. In many situations, tacky materials, slurries, or other like materials are distributed through existing valve devices, difficulties arise when the valve includes more than one outlet or destination. Typically, these valves require that the flow of such fluids or materials must be stopped before the valve changes positions from one outlet to another. The existing valves that do allow for a change in position without stopping the flow of the entering fluid or material often have areas within the valve that are flooded (i.e., areas where fluids or materials have built up from prior cycling of the valve position). The build-up of such fluids or materials can potentially cause damage to the valve (e.g., if the fluid or material contains corrosive, reactive, tacky, or other potentially-damaging components) and the degradation of the materials within the build-up areas and/or cross contamination of older materials with newer materials. Accordingly, there exists a need for improved valve devices and methods for distributing the flow materials, particularly but not limited to tacky materials.

BRIEF SUMMARY

The various embodiments of the present invention provide a rotary valve device, comprising an inlet and a plurality of tapering outlets; a curved discharge chute disposed between the inlet and the plurality of outlets; a main shaft extending from the discharge chute through a bottom-mounted actuator; and an encoder coupled to the bottom-mounted actuator and fixably attached to the main shaft.

Other exemplary embodiments provide a rotary valve device, comprising an inlet and a plurality of tapering outlets; a curved discharge chute disposed between the inlet and the plurality of outlets; a main shaft extending from the discharge chute; a secondary shaft coupled to the main shaft via an intermediate coupling device, wherein the secondary shaft extends through a bottom-mounted actuator; and an encoder coupled to the bottom-mounted actuator and fixably attached to the secondary shaft.

Further, other exemplary embodiments provide a method of outputting a material, comprising feeding a material into an inlet of a rotary valve device; transporting the material through a rotating discharge chute; rotating the discharge to a first outlet; outputting the material through the first outlet; rotating the discharge to a second outlet; and outputting the material through the second outlet; wherein the material continuously flows from the inlet to at least one of the outlets and further wherein the rotating discharge chute is bottom-actuated.

BRIEF DESCRIPTION OF THE DRAWINGS

FIG. 3A is a schematic illustration of a side cross-sectional view of an alternative valve device utilizing a pneumatic actuation means in accordance with exemplary embodiments of the present invention.

FIG. 3B is a schematic illustration of a valve bearing of FIG. 3A in accordance with exemplary embodiments of the present invention.

DETAILED DESCRIPTION

Figure 1A:
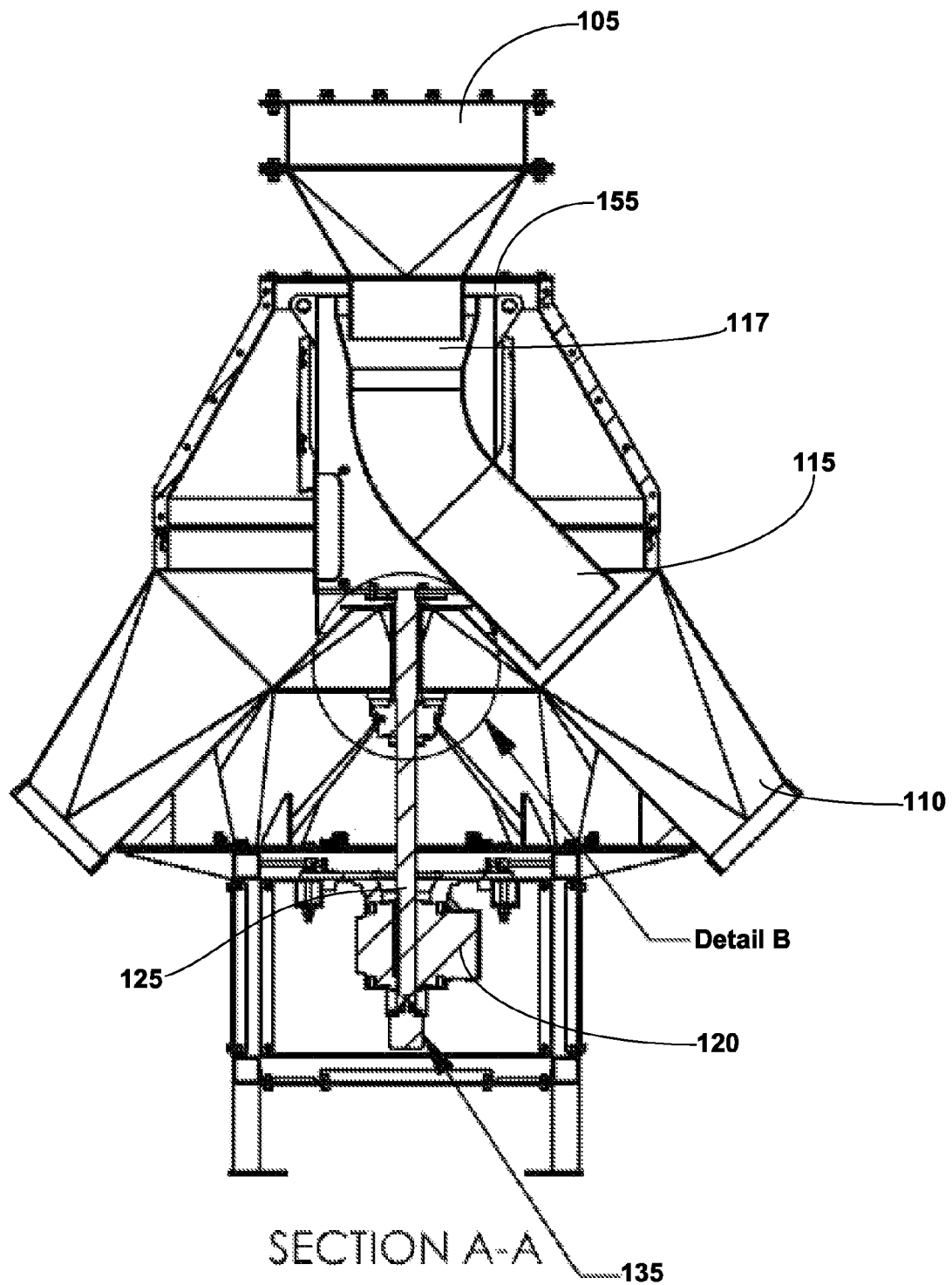
FIG. 1A is a schematic illustration of a side cross-sectional view of a valve device utilizing an electrical actuation means in accordance with exemplary embodiments of the present invention.

The various embodiments of the present invention are directed to valve devices, systems, and methods for controlling the distribution of materials to multiple locations. The improved valve devices, materials distribution systems, and materials distribution methods disclosed herein are particularly suitable for use in applications where the materials being distributed are, for example but not limited to, non-gaseous fluid materials (e.g., raw liquids, solutions, slurries, colloids, suspensions, and the like) and solid materials having some level of tackiness, moisture content, or like property. It is important to note that the valve systems and methods disclosed herein are not limited to the materials described above, but also can be used in applications involving dry solids.

The valves, systems, and methods disclosed herein can be operated without having to stop the flow of materials therethrough in order to change the position of the valve from one outlet to another. Further, the valves and systems disclosed herein have few directional changes, therefore there are few, if any, points within the system where the material can get stuck and/or lodged.

Referring to the drawings collectively, it shall be understood that they provide various schematic illustrations of a rotary valve device comprising a single inlet and a plurality of outlets. Specifically, a shaft is actuated from the bottom of the valve system, as opposed to the top as in the case of prior art embodiments, and propels a curved discharge chute to respective outlets. The actuation means and the dimensions of the rotary valve device can be tailored to address specific needs of the material being transported through the system, the space available in the installation area, and the hazard or non-hazard rating of the area.

Figure 1B:
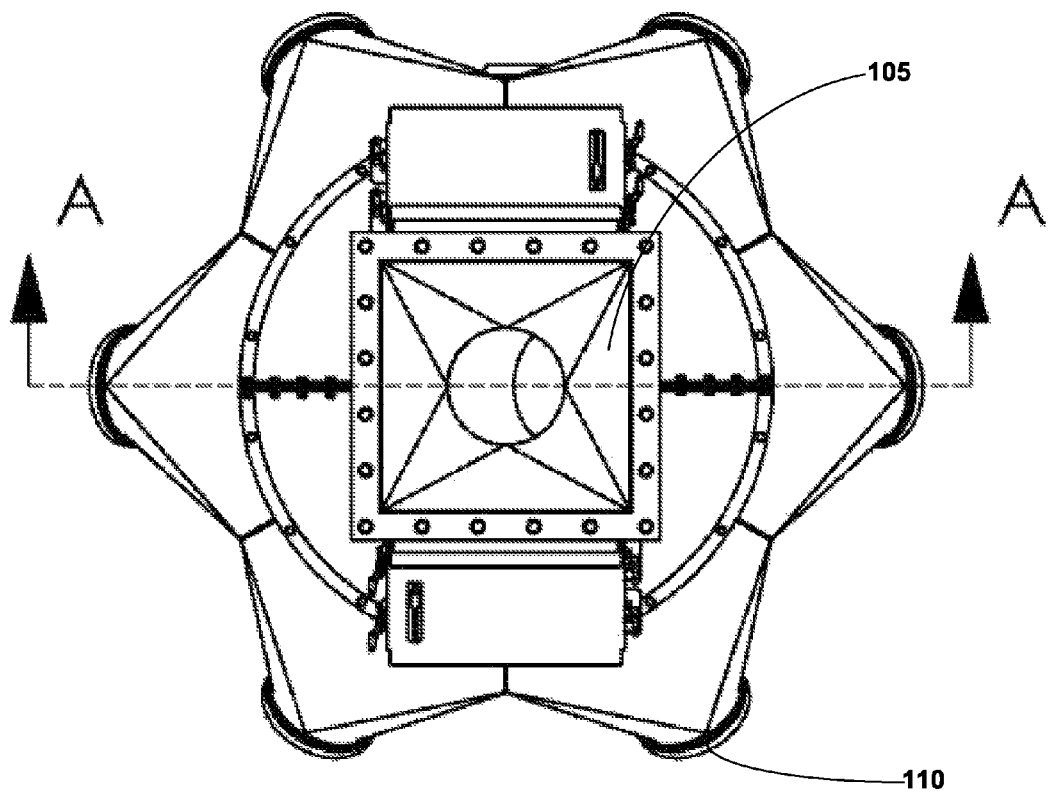
FIG. 1B is a schematic illustration of a perspective top view of the valve device illustrated in FIG. 1A, wherein line A-A corresponds with Section A-A of FIG. 1A in accordance with exemplary embodiments of the present invention.

Referring to FIG. 1A, there is shown an exemplary embodiment of a rotary valve device in accordance with the present invention. The rotary valve device comprises a single inlet 105 to receive an incoming stream of material. As illustrated, the inlet 105 can have a tapered interior structure to facilitate the flow of material into the rotary valve device. FIG. 1B further illustrates this tapered interior structure. Also illustrated in FIG. 1A is a plurality of outlets 110. In exemplary embodiments, at least two outlets 110 are preferred for operation. Depending on the material being processed, the outlets 110 can feed directly into holding tanks of a pellet conditioning system or a bagging system. Disposed between the inlet 105 and the outlets 110 is a discharge chute 115. The discharge chute 115 is adapted to rotate around to each outlet 110 and discharge material into the respective outlets 110. The discharge chute 115 has few directional changes to facilitate continuous and uninterrupted flow of material. In prior art embodiments, there is often dead space between the outlets, thus causing the material being discharged from the discharge chute to lodge between the outlets, which consequently causes undesirable blockages and system malfunctions, such as the degradation of materials within build-up areas and/or cross contamination of older materials with newer materials. In the exemplary embodiments of the present invention, however, the outlets 110 are configured to eliminate dead space between the outlets. Further, the outlets 110 are spaced equidistantly from each other and taper to facilitate the distribution of the material out of the device. Further, the tapering of the outlets and the angle of the outlets aids in minimizing splash of the materials. Additionally, the top portion 117 of the discharge chute 115 is tapered to facilitate the smooth rotation of the discharge chute 115 around to the respective outlets 110. This configuration combination enables material to be evenly distributed to the respective outlets 110 without the hang-ups often associated with prior art embodiments. It shall be understood that the cross-section of the discharge chute 115 can be of many geometric configurations, for example but not limited to, triangular, round, square, or polygonal.

Additionally, the rotary valve device can further comprise a gasket ring 155 that surrounds the top portion 117 of the discharge chute 115 to aid in the prevention of splashing often associated with pellet-fluid slurries and bouncing often associated with dry and/or tacky pellets.

The rotary valve device further comprises a gear box 120 to control the movement of the discharge chute 115. The interior of the gear box 120 comprises a gear reduction unit that turns a main shaft 125, which subsequently propels the rotation of the discharge chute 115. The gear box 120 is substantially, if not completely, enclosed to eliminate the interference of external elements, such as water, dust, etc. The gear box 120 is powered by an electrical motor 130, illustrated in FIG. 1C, which is coupled to the gear box 120 at a right angle to shaft 125. It shall be understood that while this embodiment utilizes an electrical actuator, other embodiments can utilize a pneumatic or hydraulic actuator, which will be further discussed herein. It shall be further understood that the actuator utilized in the present invention far surpass the chain and sprocket (poor alignment) and v-belt (susceptible to slipping) designs of the prior art as the actuator of the present invention provides more consistent and precise control of the main shaft 125 and thus more consistent and precise control of the discharge chute 115. This is important as the type of material directly influences the rotational speed of the discharge chute 115.

As further illustrated in FIG. 1A, the main shaft 125 can extend through the gear box 120. The gear box 120 and/or the main shaft 125 can be correspondingly keyed so that additional couplings are not needed, and to achieve better control of the main shaft 125 (and, by extension, better control of the discharge chute 115). This design allows for minimization or elimination of any movement or drift of the discharge chute 115 during operation of the valve device.

The main shaft 125 can further extend to an encoder 135, which is coupled to the gear box 120. More specifically, the encoder 135 can be fixably attached to the main shaft 125. The encoder serves as an indicator to the electrical control system of the location and position of the discharge chute 115 during operation of the rotary valve device. Even more specifically, the encoder 135 enables precise position feedback at any given position of the discharge chute 115 with an accuracy of less than one degree of rotation, which is particularly important for subsequent bagging operations. In this manner, greater constant control of the valve device can be achieved. In prior art embodiments, their location device only provides position feedback when a discharge chute is aligned with an outlet chute.

Figure 1C:
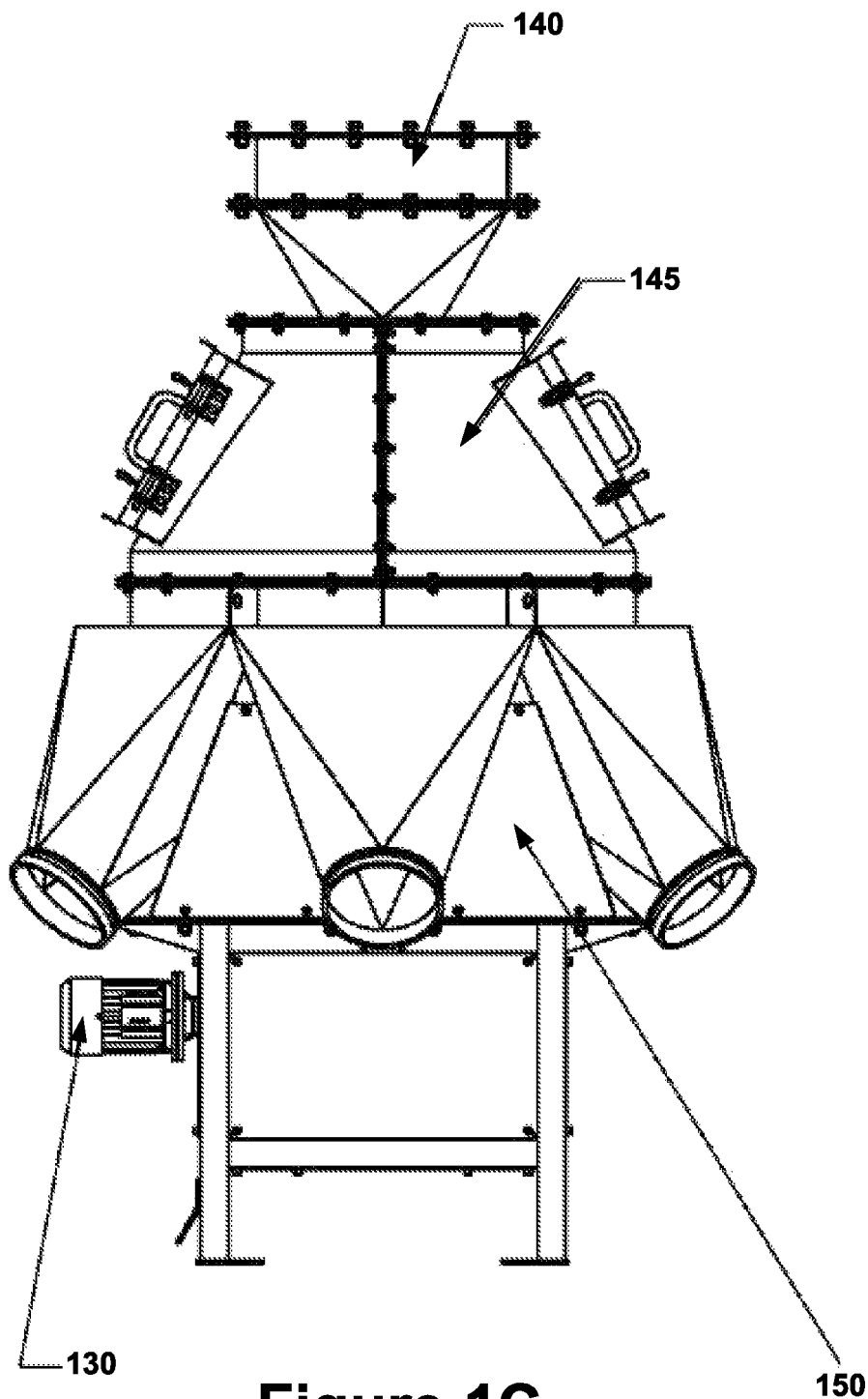
FIG. 1C is a schematic illustration of an exterior view of the valve device illustrated in FIG. 1A in accordance with exemplary embodiments of the present invention.
Figure 1D:
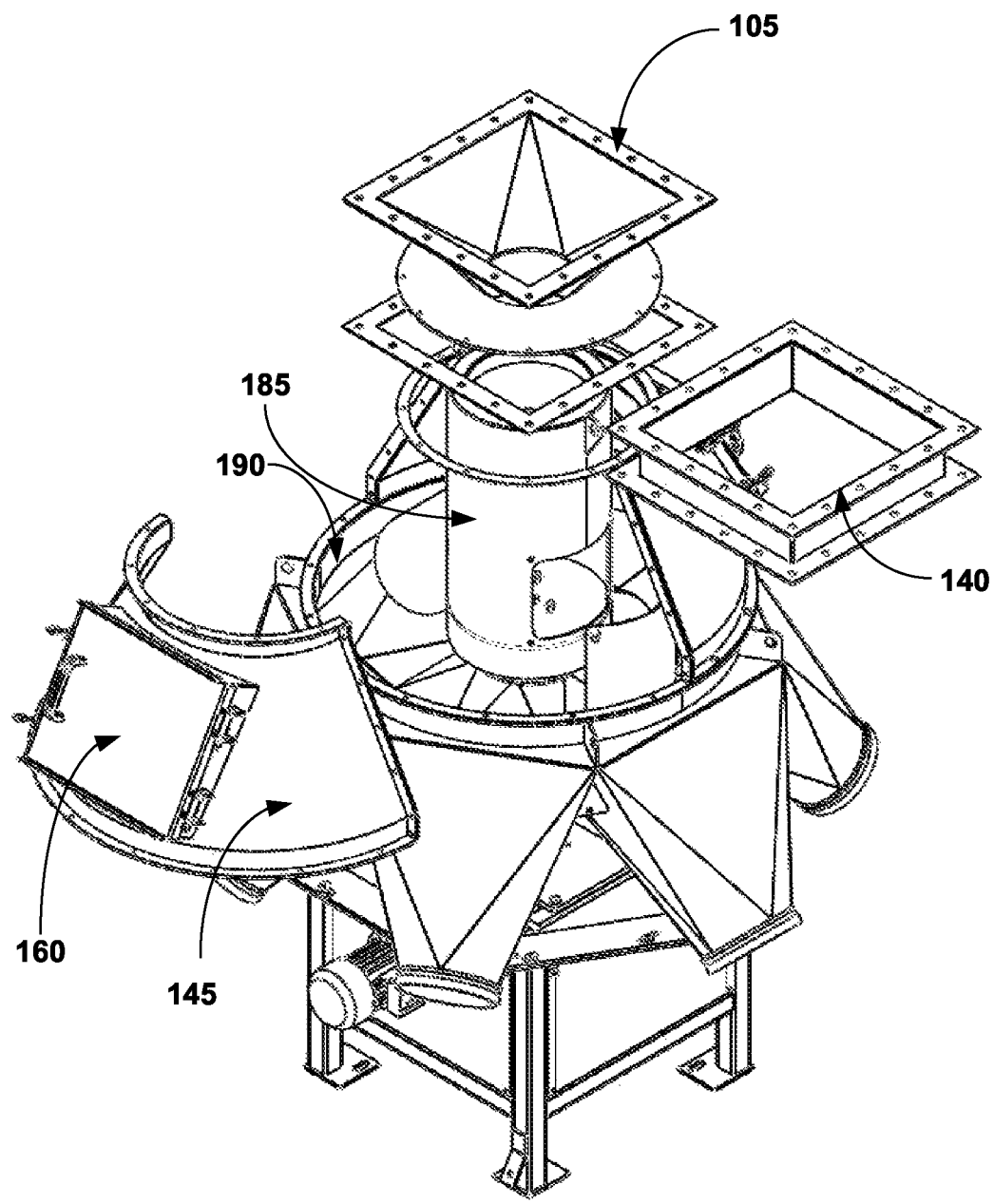
FIG. 1D is a schematic illustrated of a partitioned exterior view of the valve device illustrated in FIG. 1A in accordance with exemplary embodiments of the present invention.

Referring now to FIG. 1C, there is shown an exterior view of the rotary valve device. In this illustration, the rotary valve device comprises an optional chute extension 140, which can be used, for example, to provide an accessible space between the connection between the rotary valve device and upstream equipment, thus allowing a user to access the interior of the rotary valve device without having to remove rotary valve device components or the upstream equipment. It shall further be understood that the chute extension 140 and or the inlet 105 can be of many shapes and dimensions, for example but not limited to, rectangular or round, to better accommodate an upstream device and/or material source. For example, and as illustrated in FIGS. 1A-1D, the inlet 105 can be rectangular. Alternatively, and as illustrated in FIGS. 2A and 2C, the inlet can be round. It shall be understood that the inlet 105 is not limited to these geometrical configurations, and can be for example, triangular or of any polygonal shape.

The rotary valve device also comprises a lid 145 interposed between the inlet 105 and the outlets 110. The rotary valve device illustrated in FIG. 1C includes an optional two-piece lid 145. This two-piece lid 145 is also shown in the perspective view of FIG. 1D. Advantageously, the two-piece lid 145 permits for easier assembly and disassembly of the rotary valve device. Each half of the two-piece lid 145 can include a door 160 to permit easy access to the inner components of the valve device. These doors 160 can be seen more completely in the perspective views of FIGS. 1D and 1E.

Figure 1E:
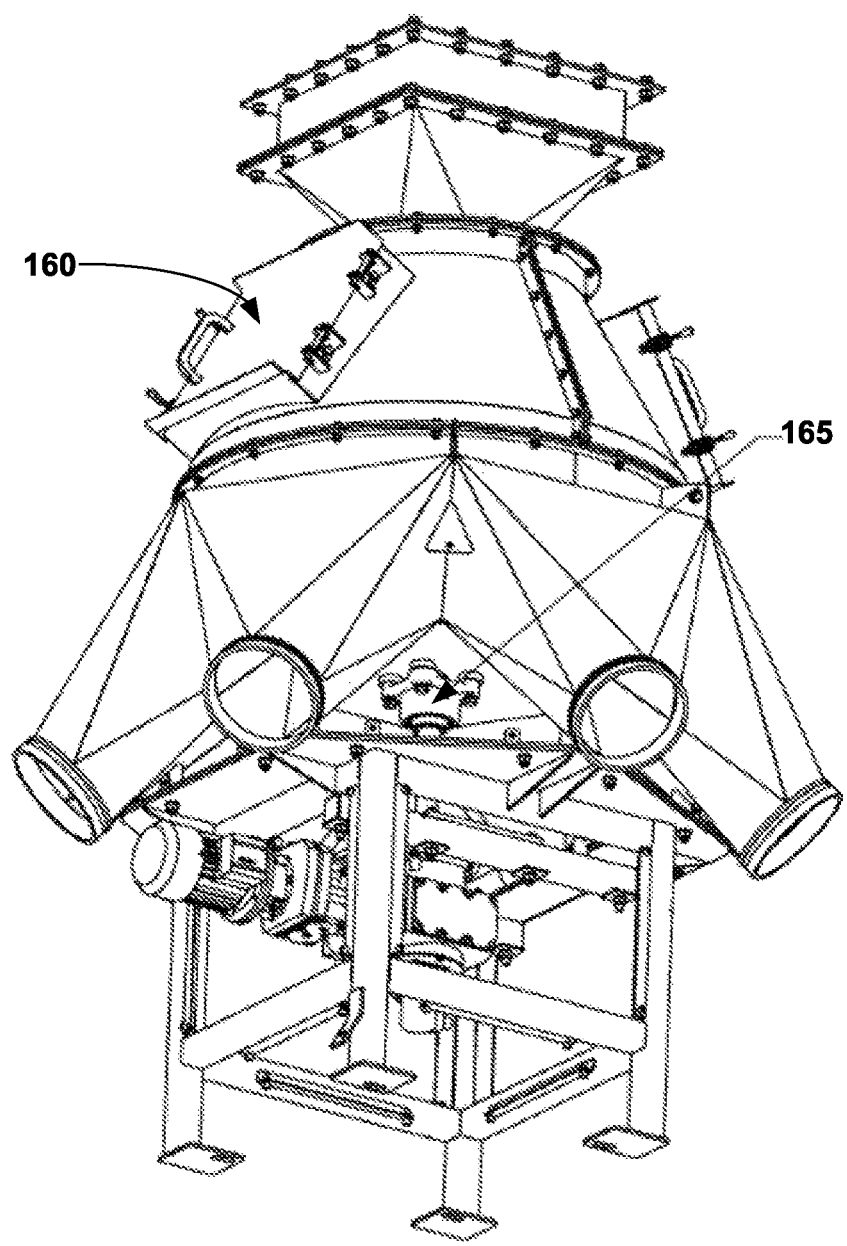
FIG. 1E is a schematic illustration of an alternative side view of the valve device illustrated in FIG. 1A in accordance with exemplary embodiments of the present invention.
Figure 1F:
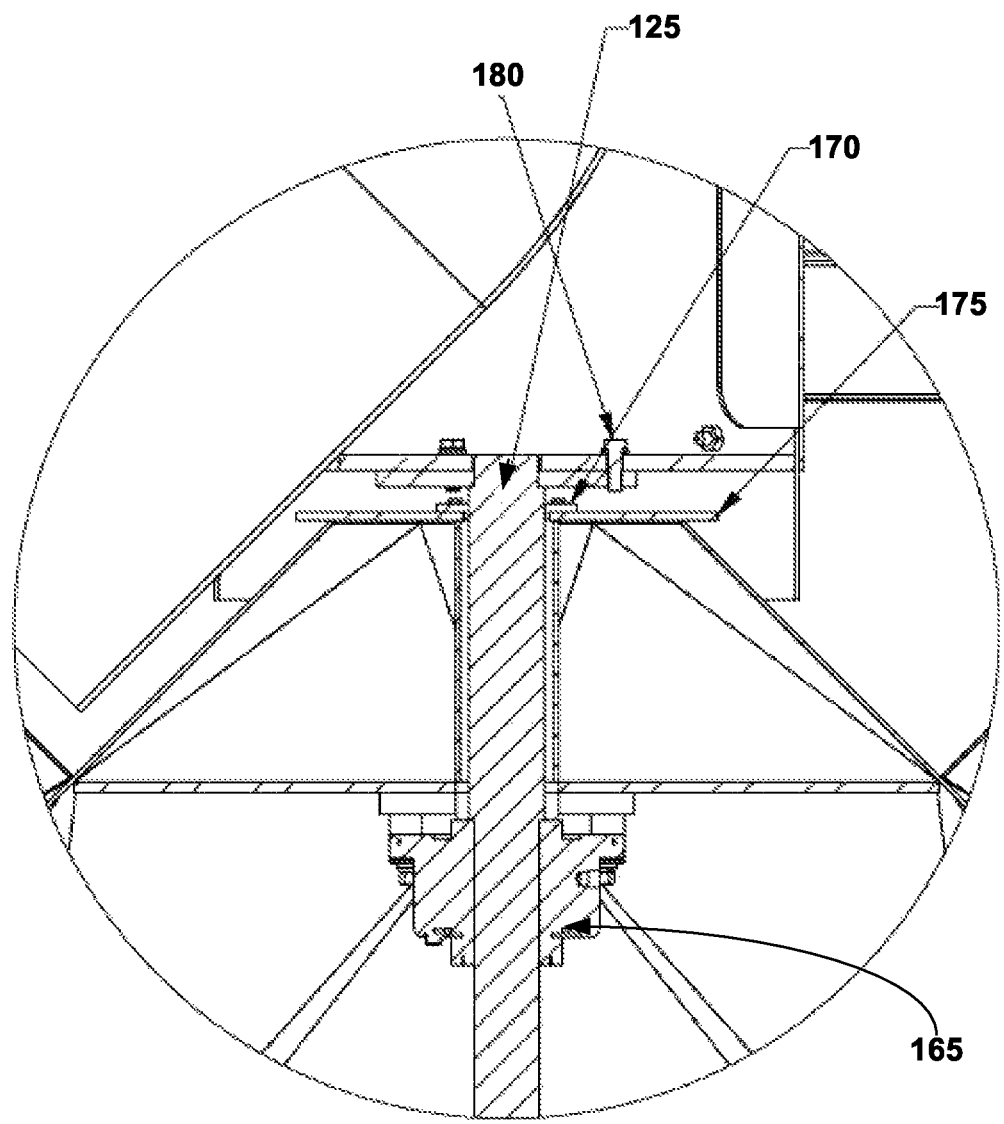
FIG. 1F is a schematic illustration of a portion, labeled as Detail B, of the valve device of FIG. 1A in accordance with exemplary embodiments of the present invention.

Further illustrated in FIG. 1C are removable guards 150 which enable easier access to the valve bearing 165, further illustrated in FIGS. 1E and 1F. These optional guards can be secured in place by any conventional fastening device.

Referring now to FIG. 1F, there is illustrated a more detailed view of the portion of the rotary valve system of FIG. 1A labeled "Detail B," which illustrates the upper portion of the main shaft 125 and the bottom-mounted valve bearing 165. It shall be understood that the valve bearing 165 is a standard commercially-available bearing and thus does not need to be custom made, distinguishing it from other prior art embodiments. Furthermore, because the valve bearing 165 is bottom mounted, external as opposed to internal lubrication can be carried out, therefore a user does not have to worry about lubricating fluid contaminating or leaking inside the material (pellet or slurry) flow areas of the rotary valve device. In effect, there is no risk of contamination to the materials being processed.

Further illustrated in FIG. 1F is a shaft guide 170, which can be made of a soft material, such as nylon, and a splash plate 175, which keeps the material flowing through the rotary valve system from getting into the main shaft 125 and valve bearing 165 region.

The main shaft 125 is in mechanical communication by exemplary means of a fastening device 180 with a movable inlet pipe assembly 185, which is attached to the discharge chute 115. The inlet pipe assembly 185 correspondingly rotates with the discharge chute. A funnel trough 190 is disposed just below the discharge chute 115 and the inlet pipe assembly 185 and effectively serves as a hopper-type device that minimizes or prevents splashing or bounce-back of the material to an outlet 110 through which the material is not intended to flow (i.e., any of the outlets into which the discharge chute 115 is not currently directed). The funnel trough 190 is a stationary component and thus does not rotate with the discharge chute 115 or the inlet pipe assembly 185. The funnel trough 190 is open to the atmosphere, but is enclosed within the rotary valve system. In this manner, flow of the material does not need to be stopped in order to change the position of the discharge chute 115 from one outlet 110 to another outlet 110.

The rotary valve device can be designed to have certain internal adjusting mechanisms, which can assist with alignment of the main 125 shaft and the moving component of the inlet pipe assembly 185. Such mechanisms can be used to avoid unnecessary rubbing or binding of parts, and can also provide additional clearance for the splash plate 175.

In certain cases, the use of shims can further assist with such adjustments. That is, shims can be placed at the valve bearing 165 to lift the moving component of the inlet pipe assembly 185 upwards so as to separate it from the funnel trough 190.

Figure 2B:
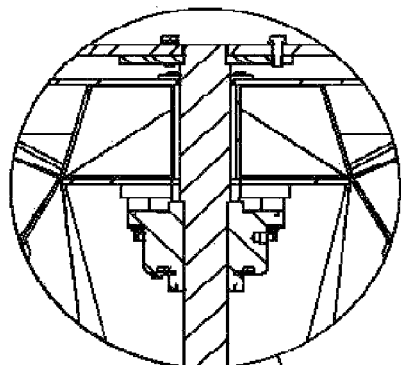
FIG. 2B is a schematic illustration of a valve bearing of FIG. 2A in accordance with exemplary embodiments of the present invention.
Figure 2A:
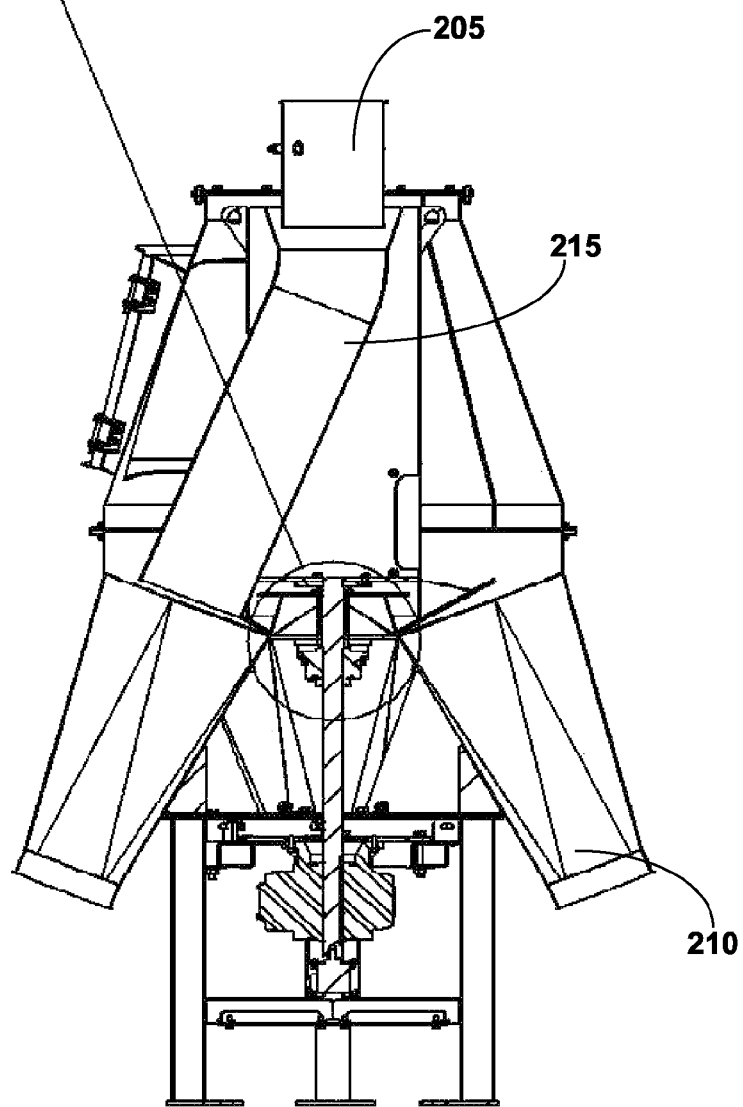
FIG. 2A is a schematic illustration of a side cross-sectional view of an alternative valve device utilizing an electrical actuation means in accordance with exemplary embodiments of the present invention.
Figure 2C:
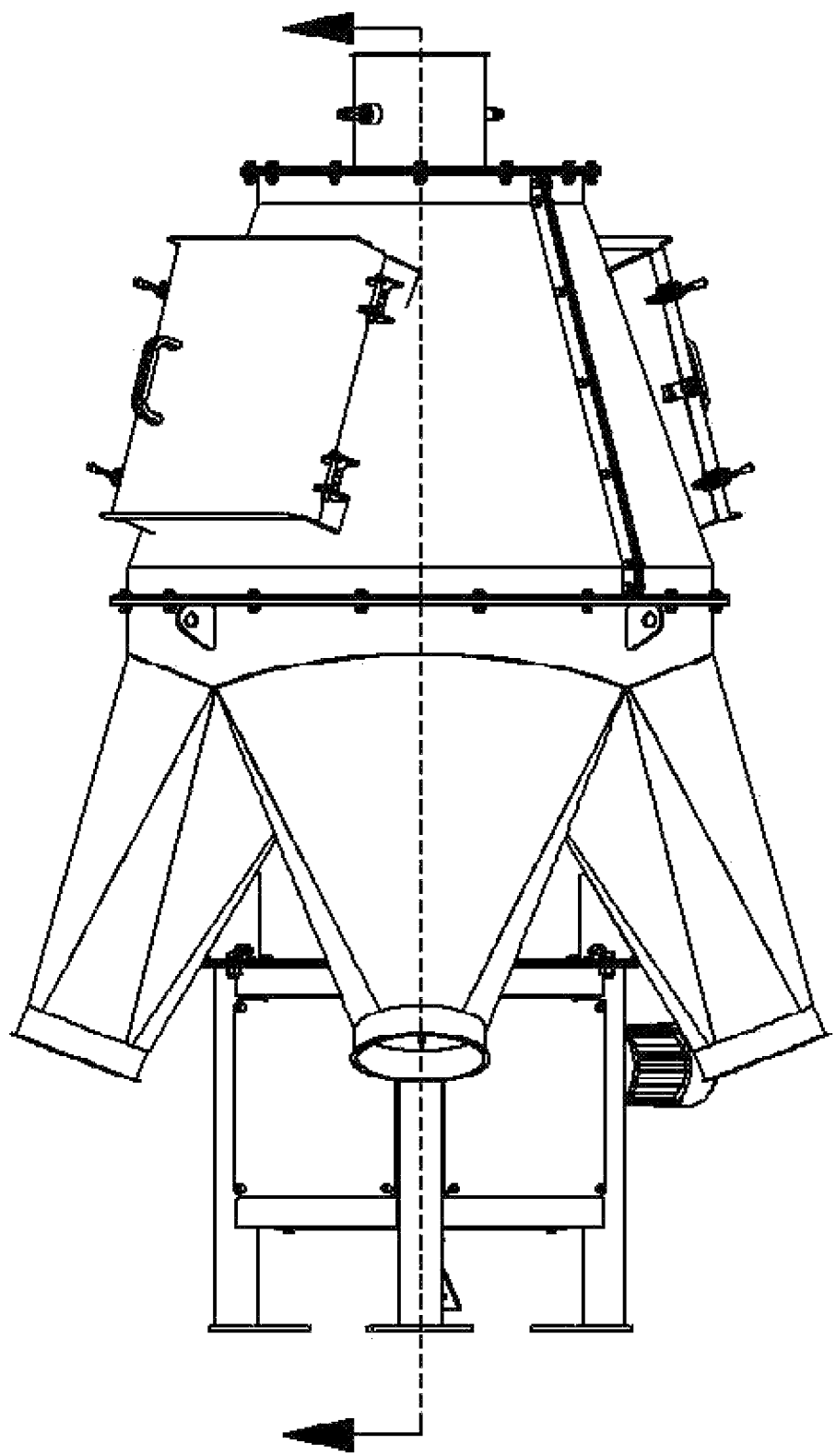
FIG. 2C is a schematic illustration of a side view of the valve device illustrated in FIG. 2A in accordance with exemplary embodiments of the present invention.

Referring to FIGS. 2A-2C, there is shown another exemplary embodiment of the rotary valve device in accordance with the present invention. Generally, this embodiment comprises the same components as described above; however, the discharge chute 215 angle and the outlet 210 angles are slightly steeper, and the inlet 205 is circular. As previously mentioned, the dimensions of the rotary valve device can be tailored to accommodate a specific material, capacity, and installation requirements. For example, the embodiment illustrated in FIGS. 1A-1F is more suitable for non-tacky materials and pellet-fluid slurries, whereas the embodiment illustrated in FIGS. 2A-2C is more suitable for tacky materials. Preferably, the discharge chute 215 angle illustrated in FIGS. 2A-2C is about 22.5° with respect to the vertical, whereas the discharge chute 115 angle illustrated in FIGS. 1A-1F is about 45° with respect to the vertical. It shall be understood, however, the rotary valve devices are in no way limited to these angles, and can range from about 10° to 80° with respect to the vertical.

Figure 3C:
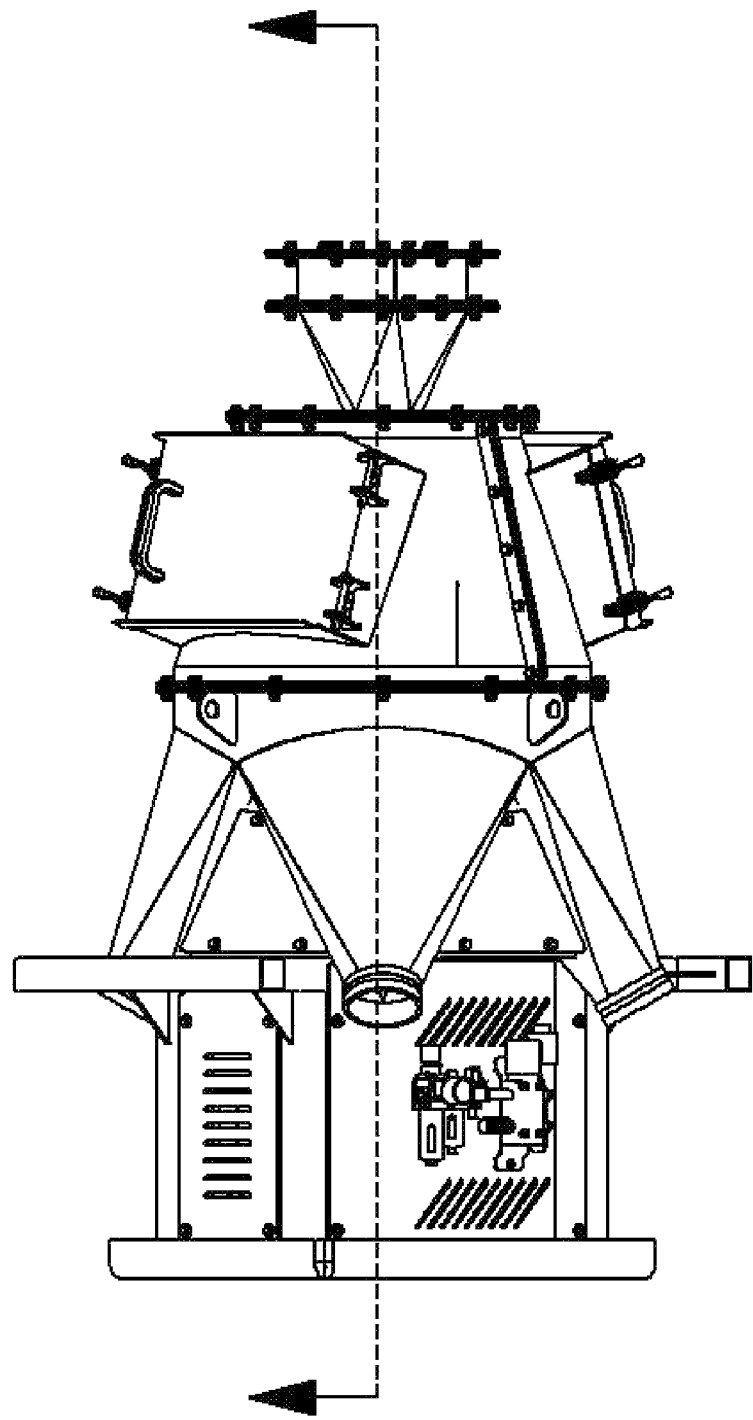
FIG. 3C is a schematic illustration of a side view of the valve device illustrated in FIG. 3A in accordance with exemplary embodiments of the present invention.

Referring to FIGS. 3A-3C, there is shown yet another exemplary embodiment of the rotary valve device in accordance with the present invention. Again, this embodiment generally comprises the same components as described above; however, this embodiment is pneumatically actuated as opposed to being electrically actuated. In some environments, such as hazardous environments, it is undesirable to utilize electricity. As illustrated in FIG. 3A, there are two shafts, instead of one as in the electrical embodiment, a main shaft 325 and a secondary shaft 330. The main shaft 325 is coupled to the secondary shaft 330 by an intermediate coupling device 335. This embodiment further comprises a gear drive 340, however there is no need for an electrical motor as in the other embodiments.

The rotary valve systems described herein can be used in a variety of materials and distribution systems. In exemplary embodiments, the rotary valve systems can be used in systems that distribute pellets of polymer-containing or non-polymer-containing materials. For example, the pellets can be in the form of dry pellets, a slurry, tacky pellets, and/or the like. In cases where the pellets are not in the form of dry pellets, the internal surfaces to which the pellets make contact may need to be modified to prevent deterioration of the valve device. For example, if the pellets are contained in a slurry, and the slurry comprises a corrosive or reactive liquid component, then the internal surfaces of the valve device can be coated with a corrosion- and/or reaction-resistant coating. In addition, or in the alternative, if the pellets exhibit some level of tackiness, then the internal surface of the valve device can be coated with an adhesion-resistant or non-stick coating.

Accordingly, components of the rotary valve devices of the present invention that come in contact with the material (e.g., interior components) can be surface treated with a variety of coatings, for example, corrosion protection, wear and abrasion resistance, surface traction, low friction, non-conductive, conductive coatings, or combinations thereof, depending on the material being used. Surface treatments as described herein can involve at least one, preferably two, and optionally multiple processes inclusive and exemplary of which are cleaning, degreasing, etching, primer coating, roughening, grit-blasting, sand-blasting, peening, pickling, acid-wash, base-wash, nitriding, carbonitriding, electroplating, electroless plating, flame spraying including high velocity applications, thermal spraying, plasma spraying, sintering, dip coating, powder coating, vacuum deposition, chemical vapor deposition, physical vapor deposition, sputtering techniques, spray coating, roll coating, rod coating, extrusion, rotational molding, slush molding, and reactive coatings utilizing thermal, radiational, and/or photoinitiation cure techniques, nitriding, carbonitriding, phosphating, and forming one or more layers thereon. The layers can be similar in composition, different in composition, and many combinations thereof in multiple layer configurations.

Materials applied utilizing these processes can include at least one of metals, inorganic salts, inorganic oxides, inorganic carbides, inorganic nitrides, inorganic carbonitrides, corrosion inhibitors, sacrificial electrodes, primers, conductors, optical reflectors, pigments, passivating agents, radiation modifiers, primers, topcoats, adhesives, and polymers including urethanes and fluorourethanes, polyolefins and substituted polyolefins, polyesters, polyamides, fluoropolymers, polycarbonates, polyacetals, polysulfides, polysulfones, polyamideimides, polyethers, polyetherketones, silicones, and the like without intending to be limited. The inorganic salts, inorganic oxides, inorganic carbides, inorganic nitrides, and inorganic carbonitrides are preferably metal salts, metal oxides, metal carbides, metal nitrides, and metal carbonitrides respectively.

During operation of a rotary valve system as described herein, a material is first fed into the inlet. The material will continuously flow from the inlet into the curved discharge chute. Upon exiting the curved discharge chute, the material will flow through at least one outlet of the valve device for a duration of time until the desired or intended amount of material is needed. The curved discharge chute can then rotate via the main shaft to another outlet, through which additional material will flow. In exemplary embodiments, the flow of the material into the inlet of the valve device will not need to be stopped during this transition of the curved discharge chute from a first outlet to a second outlet. That is, the valve device can operate continuously, while still distributing the desired amount of material into each outlet. It shall be understood that in embodiments where the discharge chute is continuously rotating, material can flow into a plurality of outlets at the same time, as the flow of material into one outlet may be finishing up while the material into another outlet is starting. In embodiments where the discharge chute is intermittently rotating, i.e., stops at one outlet for a duration of time, the material can flow into a plurality of outlets at the same time as previously describe, but will most likely flow into one outlet at a time. The rotary valve device of the present invention can be implemented into a number of pelletization crystallization or conditioning processes. In one exemplary process, material being transported by a fluid can be pelletized within a pelletizing system. The pellet-fluid slurry can then travel to an agglomerate catcher adapted to remove large agglomerates within the pellet-fluid slurry. The agglomerate catcher fits directly on the top of the rotary valve device of the present invention, such that the rotary valve receives the pellet-fluid slurry (with the agglomerates removed) and outputs the pellet-fluid slurry into a plurality of reservoirs aligned with the plurality of outlets, as desired by a user. It shall be understood that standard agglomerate catchers comprise rectangular outlets, thus it is preferable for the rotary valve device to comprise a rectangular inlet that complements the outlet of the agglomerate catcher. The pellets of the pellet-fluid slurry can be subsequently dried by a downstream defluidizing process.

In yet another exemplary process, material being transported by a fluid can be pelletized within a pelletizing system. The pellet-fluid slurry can then be transported to a dryer to remove the fluid, which usually results in dried pellets that become tacky. The dried, tacky pellets are then transported via a pipe to the rotary valve device of the present invention. In this process, a circular inlet is desirable to accommodate the circular pipe outlet. The rotary valve device then outputs the dried, tacky pellets into a plurality of bagging units aligned with the plurality outlets, as desired by a user. The dried, tacky pellets are then sealed within the bags. It shall be understood that this invention shall not be limited to the process described herein.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or compositions to these described aspects are also contemplated by the teachings herein. Therefore, the present disclosure should not be limited to any single aspect, but rather construed in breadth and scope in accordance with the appended claims

The invention claimed is:

1. A method of outputting a material, comprising:
feeding the material into an inlet of a rotary valve device;
directing a first portion of the material into a tapered first outlet with a rotatable discharge chute, wherein a fraction of the first portion of the material is also directed into the first outlet with a funnel trough to prevent splashing or bounce-back of the material into an unintended outlet;
rotating the rotatable discharge chute from the first outlet to a tapered second outlet; and
directing a second portion of the material into the second outlet with the rotatable discharge chute, wherein a fraction of the second portion of the material is also directed into the second outlet with the funnel trough to prevent splashing or bounce-back of the material into an unintended outlet and the funnel trough is above the first outlet and the second outlet.

2. The method of claim 1 further comprising rotating the rotatable discharge chute continuously from the first outlet to the second outlet such that the rotatable discharge chute does not stop at the first outlet or the second outlet.

3. The method of claim 1 further comprising rotating the rotatable discharge chute continuously from the first outlet to the second outlet and to a third outlet such that the rotatable discharge chute does not stop at the first outlet, the second outlet, or the third outlet.

4. The method of claim 1 further comprising directing the material into the first outlet and the second outlet at the same time.

5. The method of claim 1, wherein the first portion of the material and the second portion of the material flow continuously through the rotary valve device without stopping.

6. The method of claim 5, wherein the first portion of the material and the second portion of the material are tacky.

7. The method of claim 1 further comprising providing the position of the discharge chute at any position of the discharge chute.

8. A method of outputting a material, comprising:
feeding the material into an inlet of a rotary valve device;
transporting a first portion of the material through a rotatable discharge chute and to a tapered first outlet, wherein during the transportation a fraction of the first portion of the material splashes or bounces back from the first outlet;
funneling back to the first outlet the fraction of the first portion of the material that splashes or bounces back from the first outlet with a funnel trough;
transporting a second portion of the material through the rotatable discharge chute and to a tapered second outlet, wherein during the transportation a fraction of the second portion of the material splashes or bounces back from the second outlet; and
funneling back to the second outlet the fraction of the second portion of the material that splashes or bounces back from the second outlet with the funnel trough, wherein the funnel trough is above the first outlet and the second outlet.

9. The method of claim 8 further comprising rotating the rotatable discharge chute from the first outlet to the second outlet.

10. The method of claim 8 further comprising transporting the material into the first outlet and the second outlet at the same time.

11. The method of claim 8, wherein the material comprises pellets.

12. The method of claim 11, wherein the pellets are tacky and wherein the tacky pellets are continuously moving in the rotary valve.

13. The method of claim 11, wherein the material further comprises liquid.

14. The method of claim 8 further comprising providing the position of the discharge chute with an encoder.

15. The method of claim 8 further comprising receiving the position of the discharge chute at any position of the discharge chute.

16. The method of claim 8 further comprising bagging the first portion of the material.

17. The method of claim 8 further comprising feeding the first portion of the material from the first outlet into a first bagging system and feeding the second portion of the material from the second outlet into a second bagging system.

18. The method of claim 8 further comprising conditioning the first portion of the material.

19. A method of outputting a material, comprising:
feeding a material into an inlet of a rotary valve device;
transporting the material through a rotatable discharge chute and into a tapered outlet, wherein during the transportation a portion of the material splashes or bounces back from the outlet; and
funneling, with a funnel trough above the tapered outlet, the portion of the material that splashes or bounces back from the outlet back into the outlet.

20. The method of claim 19 further comprising rotating the rotatable discharge chute from the outlet to another outlet while continuously feeding the material into the inlet of the rotary valve device.

21. The method of claim 19, wherein the material comprises dry pellets, a pellet-fluid slurry, tacky pellets, or combinations thereof.

* * * * *